United States Patent [19]

Shirai et al.

[11] 4,401,733
[45] Aug. 30, 1983

[54] ALKALINE GALVANIC CELL

[75] Inventors: Iwao Shirai; Keigo Momose; Tadashi Sawai, all of Hirakata; Masakazu Komatsu, Kashihara; Takao Inoue, Hirakata; Tamotsu Wakahata, Katano, all of Japan

[73] Assignee: Matsushita Electric Industrial Co., Ltd., Japan

[21] Appl. No.: 333,616

[22] Filed: Dec. 22, 1981

[30] Foreign Application Priority Data

Dec. 26, 1980 [JP] Japan .............................. 55-186362

[51] Int. Cl.$^3$ ............................................ H01M 2/08
[52] U.S. Cl. .................................... 429/174; 429/185
[58] Field of Search ............. 429/174, 185, 171, 173, 429/206; 29/623.2

[56] References Cited

U.S. PATENT DOCUMENTS 3,713,896  1/1973  Feldhake ............................. 429/174
3,922,178  11/1975  Winger ............................ 429/206 X
4,248,944  2/1981  Smilanich ....................... 429/174 X
4,256,815  3/1981  Smilanich ........................... 429/185

Primary Examiner—Anthony Skapars
Attorney, Agent, or Firm—Wenderoth, Lind & Ponack

[57] ABSTRACT

An improved alkaline galvanic cell which includes an anode sealing plate of a layered structure serving as an anode terminal and having a copper layer as the innermost layer, a cathode container serving as a cathode terminal, an insulating packing provided around the peripheral edge of the anode sealing plate to be fitted into the cathode container for hermetically sealing the cell, and two layers of sealing agents provided between the anode sealing plate and the insulating packing. One of the layers at the side of the anode sealing plate is of epoxy adduct polyamide amine having amine valence in the range of 50 to 400, while the other of the layers at the side of the insulating packing is arranged to be of chlorosulfonated polyethylene for improvement of resistance against leakage of electrolyte.

4 Claims, 3 Drawing Figures

ALKALINE GALVANIC CELL

BACKGROUND OF THE INVENTION

The present invention generally relates to an alkaline galvanic cell and more particularly, to an improvement of a sealing portion in a flat-type alkaline galvanic cell, in which a layer of epoxy adduct polyamide amine having amine valence in the range of 50 to 400, and another layer of chlorosulfonated polyethylene are provided between an innermost copper layer of an anode sealing plate and an insulating packing of the cell for improving leakage prevention.

Generally, as illustrated in FIG. 1, an alkaline galvanic cell of a flat type includes a metallic container 3 serving as a cathode terminal member (referred to as a cathode container hereinbelow) in which a cathode active substance A, a separator S, an electrolyte impregnated material E, etc. are accommodated, and a sealing plate or sealing container 1 serving as an anode terminal member (referred to as an anode sealing plate hereinbelow) in which an anode active substance C is housed. The anode sealing plate 1 is fitted into the cathode container 3, through an electrically insulating packing 2 made, for example, of synthetic resin and closely fitted around the peripheral edge of said sealing plate 1, while a layer of a sealing agent 4 is further provided between the peripheral edge of the sealing plate 1 and the insulating packing 2, with the upper peripheral edge of the cathode container 3 being crimped inwardly as shown for preventing leakage of electrolyte.

For the sealing agent as described above, there have conventionally been proposed various materials, for example, fatty polyamide as disclosed in U.S. Pat. No. 3,922,178, cured product of epoxy resin and polyamide as disclosed in U.S. Pat. No. 3,713,896, asphalt, pitch, micro-crystalline wax, fluoro plastics, etc., with certain effects being available therefrom. However, it is the present situation that a result fully satisfactory can not be obtained, even if such sealing agents as described are employed for the alkaline galvanic cells. Meanwhile, part of the present inventors have come to discover that epoxy adduct polyamide amine is suitable for a sealing agent of the alkaline galvanic cells of this kind.

Therefore, the present inventors have been carrying out research and investigation into a method for further improving the superior effects of epoxy adduct polyamide amine referred to above.

SUMMARY OF THE INVENTION

Accordingly, an essential object of the present invention is to provide an alkaline galvanic cell, for example, of a flat type which has an improved sealing construction, with superior leakage prevention.

Another important object of the present invention is to provide an alkaline galvanic cell of the above described type which is simple in structure and stable in functioning at high reliability, and can be readily manufactured on a large scale at low cost.

In accomplishing these and other objects, according to one preferred embodiment of the present invention, there is provided an alkaline galvanic cell which includes an anode sealing plate in the form of a layered clad plate which has a copper layer as the innermost layer thereof and in which an anode active substance is accommodated, a cathode container in which a cathode active substance is accommodated, an insulating packing provided around the peripheral edge of the anode sealing plate which is fitted into the cathode container for hermetically sealing the cell, and first and second layers of sealing agents provided between the innermost copper layer of the anode sealing plate and the insulating packing. The first layer which contacts the innermost copper layer of the anode sealing plate is of epoxy adduct polyamide amine, while the second layer which contacts the insulating packing is of chlorosulfonated polyethylene.

By the construction according to the present invention as described above, a highly reliable alkaline galvanic cell has been advantageously presented, with substantial elimination of disadvantages inherent in the conventional alkaline galvanic cells of this kind.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals and symbols throughout views of the accompanying drawings, with detailed description therefor being abbreviated for brevity.

DETAILED DESCRIPTION OF THE INVENTION

Figure 1:
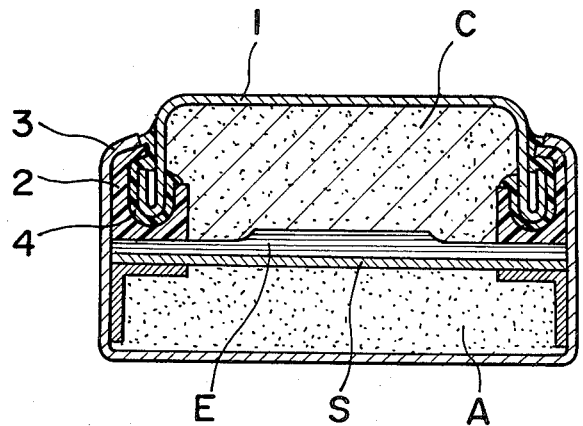
FIG. 1 is a longitudinal sectional view of a conventional alkaline galvanic cell (already referred to)

Referring now to the drawings, it is to be noted in the first place that the present invention directed to an alkaline galvanic cell, for example, of a flat type is characterized in that two layers (layers 5 and 6 in FIG. 2 and layers 5 and 7 in FIG. 3) of sealing agents are provided between the peripheral edge of the anode sealing plate 1 and the insulating packing 2, and particularly in that the sealing agent which contacts the side of the anode sealing plate 1 is composed of epoxy adduct polyamide amine, while the other sealing agent which contacts the side of the insulating packing 2 is formed by chlorosulfonated polyethylene as described in detail hereinbelow.

With attention directed to the fact that most of the leakages in alkaline galvanic cells are attributable to the so-called creep phenomenon of the electrolyte at the side of the anode sealing container, i.e. between the anode sealing plate 1 and the insulating packing 2, part of the present inventors have carefully studied into the relation between the leakage and excessive amalgamation of the innermost copper surface of the anode sealing plate 1 in the form, for example, of a three-layered construction, and discovered that, instead of a primer as disclosed in U.S. Pat. No. 4,282,293, an epoxy adduct polyamide amine, more commonly known and having amine group at the end portion, has a superior effect for preventing the leakage.

According to the experiments carried out by the present inventors, however, it has been found that even when epoxy adduct polyamide amine is employed, if amine valence is smaller than 50, leakage undesirably takes place, with excessive amalgamation, while if the amine value exceeds 400, leakage similarly occurs, even when the amalgamation does not proceed. In other words, it is considered that, in the case where the amine valence, which is a guideline to the molecular weight, is large, the molecular weight is small, with the speed of diffusion of the alkaline electrolyte being increased, thus resulting in leakage through the sealing agent, while in the case where the amine valence is small, since the amine group having active hydrogen and superior adhesion with respect to the innermost copper layer of the sealing plate 1 is present in low amount, amalgamation of the copper layer undesirably proceeds, thus resulting in leakage by creeping along the boundary faces between the innermost copper layer and the layer of the sealing agent. The present inventors have further found that, upon comparison of fatty polyamide with an epoxy adduct polyamide amine (with amine valence of about 150), the bisphenol epoxy adduct polyamide amine is superior as a sealing agent. The above superiority is considered to be attributable to the fact that, as may be analogized from the structure of the molecular chain, the construction having aromatic hydrocarbon (bisphenol group) has less molecular vibration up to high temperature as compared with a hydrocarbon single construction.

However, for fully utilizing the amalgamation prevention capacity of the epoxy adduct polyamide amine, it is necessary to employ epoxy adduct polyamide amine having as large an amine valence as possible, and thus, the present inventors have arrived at a two-layered construction employing one more layer of sealing agent. Since such one more layer of sealing agent as referred to above is required to have a large molecular weight, with strong resistance against alkali, and to be also superior in close adhesion with respect to the insulating packing, for example, of nylon, the present inventors have selected chlorosulfonated polyethylene from among various resins, whereby the requirement for the improvement of resistance against leakage has been almost satisfied. However, since the results as obtained by leakage resistance tests thereof at elevated temperature and high humidity (temperature at 60° C. and relative humidity at 90% RH) were still unsatisfactory, the present inventors have reached a conclusion that it will be most suitable to mix carbon powder into the layer of epoxy adduct polyamide amine described above, taking into account that the epoxy adduct polyamide amine layer alone still has an insufficient resistance against elevated temperatures. In connection with the above, it was found best to mix carbon powder having particle diameter in the range of 0.01 to 0.1 μm into the epoxy adduct polyamide amine at 2 to 20% by weight, because carbon powder with particle diameter smaller than 0.01 μm was not only difficult to obtain, but expensive, while carbon powder having particle diameter larger than 0.1 μm was so coarse that part of it was exposed outside the layer undesirably to facilitate the leakage. Meanwhile, the mixing rate thereof less than 2% by weight hardly had any appreciable effect, whereas that exceeding 20% by weight resulted in increase of the leakage rate.

More specifically, it has been concluded that the sealing agents in two-layered structure, in which one sealing agent prepared by mixing carbon powder having particle diameter in the range of 0.01 to 0.1 μm into 2 to 20% by weight of epoxy adduct polyamide amine is applied onto the anode sealing plate side, with another sealing agent composed of chlorosulfonated polyethylene being applied onto the insulating packing side, are most suitable for the purpose.

Hereinbelow, Examples are inserted for the purpose of illustrating the present invention, without any intention of limiting the scope thereof.

EXAMPLE 1

Figure 2:
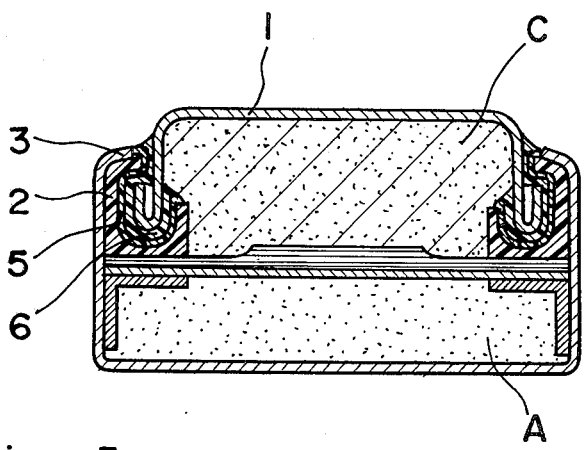
FIG. 2 is a view similar to FIG. 1, which particularly shows an alkaline galvanic cell according to one preferred embodiment of the present invention.

Referring to FIG. 2 showing a structure of an alkaline galvanic cell according to one preferred embodiment of the present invention, a toluene solution of chlorosulfonated polyethylene was first applied onto the inner peripheral surface of the insulating packing 2 for subsequent drying to form one layer 5 of sealing agent, onto which a toluene/ispropanol mixed solution of epoxy adduct polyamide amine, Töhmide 213A (name used in trade and manufactured by Fuji Kasei Kogyo Co., Ltd., Japan) was further applied so as to form the other layer 6 of sealing agent for providing a two-layered structure of the sealing agents. Thereafter, the folded portion (i.e. sealing portion) around the peripheral edge of the anode sealing plate 1 was fitted into the insulating packing 2 thus treated for complete drying of the solvent, and subsequently, cells were assembled according to the known manufacturing process of flat-type alkaline galvanic cells.

EXAMPLE 2

Figure 3:
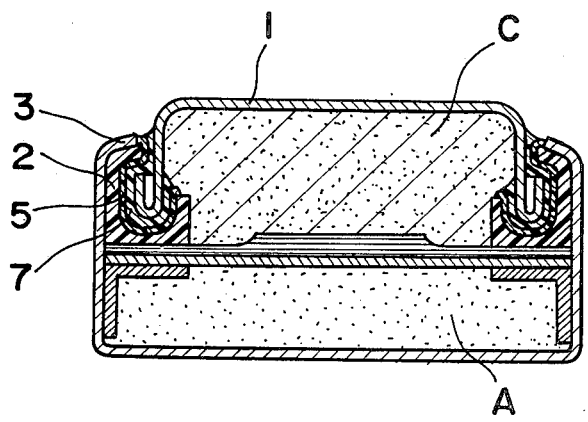
FIG. 3 is also a view similar to FIG. 1, which particularly shows an alkaline galvanic cell according to another embodiment of the present invention.

Referring to FIG. 3 illustrating a structure of an alkaline galvanic cell according to a second embodiment of the present invention, 2, 5, 20 and 30% by weight of carbon powder with respect to resin component were separately kneaded into a toluene/ispropanol mixed solution (at volume ratio of 4:1) of epoxy adduct polyamide amine, Töhmide 213A (referred to earlier), and were each applied onto a copper surface at the folded-back portion of the anode sealing plate 1 so as to from one layer 7 of sealing agent. Meanwhile, the inner peripheral surface of the insulating packing 2 was wetted by a toluene solution of chlorosulfonated polyethylene (which may alternatively be applied onto said inner peripheral surface by immersing said surface in said solution), and thereafter, the anode sealing plate 1 applied with said amine as described above was fitted into the insulating packing 2, with subsequent assembly of cells according to the known manufacturing process of flat-type alkaline galvanic cells.

In the next step, seven kinds of sample cells each of SR-44 type silver oxide cell with diameter of 11.6 mm and height of 5.4 mm were prepared as follows.

(A) Cells sealed by the sealing agents in the two-layered construction, with one layer of epoxy adduct polyamide amine, Töhmide 213A (referred to earlier) and the other layer of chlorosulfonated polyethylene as described with reference to Example 1.

(B) Cells sealed by the sealing agents in the two-layered construction, with one layer of epoxy adduct polyamide amine containing carbon powder (Ketchen black) at 2% by weight, and the other layer of chlorosulfonated polyethylene as described with reference to Example 2.

(C), (D) and (E) Cells sealed by the sealing agents in the similar two-layered construction as in the above cells (B), with the carbon powder contents in the epoxy adduct polyamide amine being altered to be 5, 20 and 30% by weight respectively.

(F) Cells sealed by a sealing agent including only one layer of epoxy adduct polyamide amine as described above.

(G) Cells sealed by a sealing agent including only one layer of chlorosulfonated polyethylene.

For each kind, 100 pieces of cells were assembled. The seven kinds of cells as described above were left to stand under the conditions at temperature of 45° C. and relative humidity of 90% RH, and also at temperature of 60° C. and relative humidity of 90% RH for 1000 hours for subsequent leakage tests through visual examination, the results of which are given in Table below.

| EXAMPLE | Leakage rate (%) 45° C., RH90% | 60° C., RH90% |
| --- | --- | --- |
| (A) | 2 | 1 |
| (B) | 8 | 5 |
| (C) | 1 | 0 |
| (D) | 1 | 1 |
| (E) | 15 | 13 |
| (F) (Comparative data) | 20 | 18 |
| (G) (Comparative data) | 40 | 65 |

As is clear from the foregoing results, alkaline galvanic cells with improved leakage resistance have been obtained by providing the layer of sealing agent, particularly, the layer of epoxy adduct polyamide amine sealing agent which contacts the anode sealing plate, and by further mixing carbon powder into said sealing agent. In the above structure according to the present invention, in addition to the effect of the epoxy adduct polyamide amine as the sealing agent, there has been utilized the commonly known effect that, upon kneading of carbon or other filling agents into resins, the temperature-time characteristics (creep characteristics) of the resin is improved. In addition, since carbon has an intermediate potential with respect to silver or silver oxide and copper or copper oxide from the viewpoint of hydrogen over-current and reference potential, this fact is considered to have some function for suppressing amalgamation on the copper surface of the anode sealing plate.

It is to be noted here that although the foregoing embodiments have been mainly described with reference to the flat type alkaline galvanic cells, the present invention is not limited in its application to the flat type alkaline galvanic cells alone, but may readily be applied, for example, to a cylindrical type alkaline cells or batteries with similar effects, and thus, highly valuable for industrial applications in that cells having remarkably high leakage resistance can be readily produced.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An alkaline galvanic cell which comprises an anode sealing plate in the form of a layered clad plate which has a copper layer as the innermost layer thereof and in which an anode active substance is accommodated, a cathode container in which a cathode active substance is accommodated, an insulating packing provided around the peripheral edge of said anode sealing plate which is fitted into said cathode for hermetically sealing said cell, and first and second layers of sealing agents provided between said innermost copper layer of said anode sealing plate and said insulating packing, said first layer which contacts said innermost copper layer of said anode sealing plate being of epoxy adduct polyamide amine, and said second layer which contacts said insulating packing being of chlorosulfonated polyethylene.

2. An alkaline galvanic cell as claimed in claim 1, wherein said epoxy adduct polyamide amine for said first layer contains carbon powder in the range of 2 to 20% in the weight ratio with respect thereto.

3. An alkaline galvanic cell as claimed in claim 1, wherein said epoxy adduct polyamide amine has amine valence in the range of 50 to 400.

4. An alkaline galvanic cell as claimed in claim 1, wherein said anode sealing plate is of a three-layered clad plate construction having said copper layer as the innermost layer.

* * * * *